United States Patent
Moriuchi et al.

(10) Patent No.: US 10,145,994 B2
(45) Date of Patent: Dec. 4, 2018

(54) LENS DEVICE AND IMAGE CAPTURING DEVICE FOR ACQUIRING DISTANCE INFORMATION AT HIGH ACCURACY

(71) Applicant: KABUSHIKI KAISHA TOSHIBA, Tokyo (JP)

(72) Inventors: Yusuke Moriuchi, Tokyo (JP); Nao Mishima, Tokyo (JP); Nobuyuki Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/950,591

(22) Filed: Nov. 24, 2015

(65) Prior Publication Data
US 2016/0154152 A1    Jun. 2, 2016

(30) Foreign Application Priority Data
Nov. 28, 2014    (JP) .................................. 2014-241744

(51) Int. Cl.
*G02B 5/20*    (2006.01)
*H04N 5/225*    (2006.01)

(52) U.S. Cl.
CPC ........... *G02B 5/201* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| 4,567,510 A * | 1/1986 | Tanaka | .................... | H04N 9/045 348/223.1 |
| 4,922,334 A * | 5/1990 | Hashimoto | ............ | H04N 9/045 348/274 |
| 4,951,130 A * | 8/1990 | Iizuka | ............... | H01L 31/02162 257/E31.121 |
| 5,703,641 A * | 12/1997 | Watanabe | ......... | H01L 31/02162 257/E31.121 |
| 6,807,295 B1 | 10/2004 | Ono | | |
| 8,138,466 B2 * | 3/2012 | Hosaka | ................... | H04N 5/332 250/208.1 |
| 8,384,818 B2 * | 2/2013 | Hiramoto | .......... | H01L 27/14621 348/274 |
| 8,520,126 B2 * | 8/2013 | Hiramoto | .......... | H01L 27/14621 348/276 |
| 2003/0112353 A1 * | 6/2003 | Morris | ................... | H04N 5/332 348/310 |

(Continued)

FOREIGN PATENT DOCUMENTS

| | | |
|---|---|---|
| JP | 3212335 | 9/2001 |
| JP | 3863319 | 12/2006 |

(Continued)

*Primary Examiner* — Shahbaz Nazrul
(74) *Attorney, Agent, or Firm* — Finnegan, Henderson, Farabow, Garrett & Dunner, L.L.P.

(57) ABSTRACT

According to an embodiment, a lens device includes a filter, an entire area of which transmits light of a common color. The filter includes a first filter region and a second filter region. The first filter region transmits light that is a first combination of colors out of colors of light to be received by an image sensor. The second filter region transmits light that is a second combination of colors of the colors of the light to be received by the image sensor. The first and second combinations of colors each include the common color.

14 Claims, 11 Drawing Sheets

(56) References Cited

U.S. PATENT DOCUMENTS

| | | | | |
|---|---|---|---|---|
| 2009/0266978 A1* | 10/2009 | Lenchenkov | .......... | G02B 5/201 |
| | | | | 250/226 |
| 2009/0284627 A1* | 11/2009 | Bando | ................ | G06K 9/00201 |
| | | | | 348/273 |
| 2013/0002825 A1 | 1/2013 | Ishii et al. | | |
| 2013/0147926 A1* | 6/2013 | Hiramoto | ............... | G03B 35/04 |
| | | | | 348/49 |
| 2013/0342661 A1* | 12/2013 | Ishii | ....................... | H04N 9/045 |
| | | | | 348/49 |

FOREIGN PATENT DOCUMENTS

| | | | |
|---|---|---|---|
| JP | 2009-276294 | | 11/2009 |
| JP | 2013-3159 | | 1/2013 |
| JP | 2013-17138 | | 1/2013 |
| JP | 2013017138 | * | 1/2013 |
| JP | 2013-37294 | | 2/2013 |
| JP | 2013-44806 | | 3/2013 |
| JP | 2013-57761 | | 3/2013 |
| JP | 2013-97154 | | 5/2013 |
| JP | 2013-246052 | | 12/2013 |
| JP | 2014-26050 | | 2/2014 |
| JP | 2014-26051 | | 2/2014 |
| JP | 2014-38151 | | 2/2014 |
| WO | WO 2012/098599 A1 | | 7/2012 |
| WO | WO 2016/003253 A1 | | 1/2016 |

\* cited by examiner

FIRST FILTER REGION  FOURTH FILTER REGION  SECOND FILTER REGION

FIG.10B

FIRST FILTER REGION  FOURTH FILTER REGION  SECOND FILTER REGION

FIG.10C

FIRST FILTER REGION  FOURTH FILTER REGION  SECOND FILTER REGION

FIG.10D

FOURTH FILTER REGION  FOURTH FILTER REGION  FIRST FILTER REGION  SECOND FILTER REGION

LENS DEVICE AND IMAGE CAPTURING DEVICE FOR ACQUIRING DISTANCE INFORMATION AT HIGH ACCURACY

CROSS-REFERENCE TO RELATED APPLICATION

This application is based upon and claims the benefit of priority from Japanese Patent Application No. 2014-241744, filed on Nov. 28, 2014; the entire contents of which are incorporated herein by reference.

FIELD

Embodiments described herein relate generally to a lens device and an image capturing device.

BACKGROUND

A conventional technology is known for acquiring distance information based on a captured image. With the technology, for example, in an image capturing device including a lens, a red (R) filter, a green (G) filter, and a blue (B) filter are disposed at the position of an aperture of the optical system of the lens, and light that has passed through the filters is received by an RGB sensor, thereby capturing images displaced depending on the depth to a subject. In this configuration, the depth of a scene can be calculated based on one of the captured images.

If the light that has passed through the filters is received by sensors in the respective identical colors corresponding to the filters, the light of a color different from the color of the filter is absorbed rather than passing through. This configuration may reduce the amount of light received by the sensor, which makes a captured image darker and noisier, leading to difficulty in calculating the depth to the subject uniquely. As a result, the distance information with high accuracy cannot be acquired based on a captured image with the conventional technology.

DETAILED DESCRIPTION

According to an embodiment, a lens includes a filter, an entire area of which transmits light of a common color. The filter includes a first filter region and a second filter region. The first filter region transmits light that is a first combination of colors out of colors of light to be received by an image sensor. The second filter region transmits light that is a second combination of colors of the colors of the light to be received by the image sensor. The first and second combinations of colors each include the common color.

First Embodiment

Figure 1:
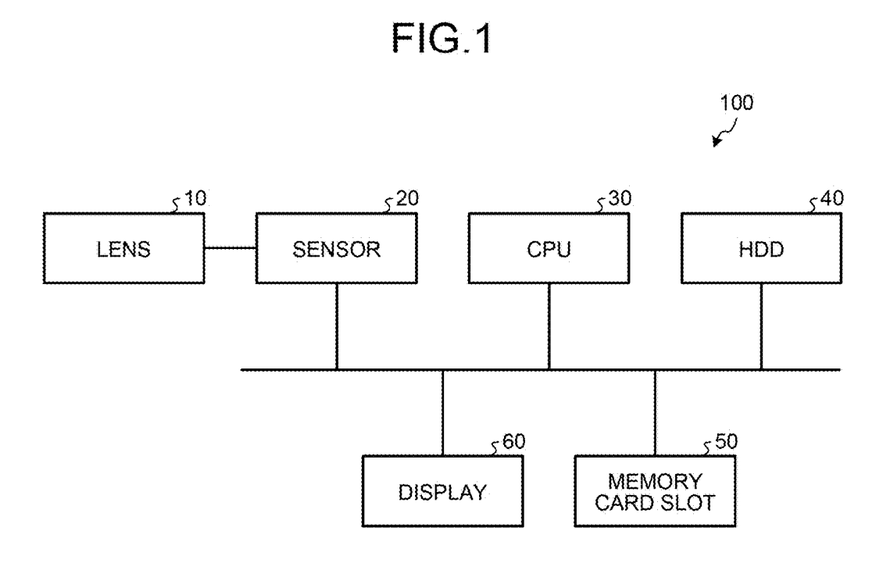
FIG. 1 is a block diagram illustrating the hardware configuration of an image capturing device according to a first embodiment.

FIG. 1 is a block diagram illustrating an example of the hardware configuration of an image capturing device according to a first embodiment. As illustrated in FIG. 1, an image capturing device 100 includes a lens 10, which may be referred to as a lens device, a sensor 20, a central processing unit (CPU) 30, a hard disk drive (HDD) 40, a memory card slot 50, and a display 60. These hardware components are coupled to each other through a bus. The image capturing device 100 captures images including any subject to be an image subject. The image capturing device 100 then generates a display image through image processing based on the information on the depth to the subject and displays the generated display image.

The lens 10 includes at its opening a filter (a color filter) on which the light reflected off the subject in image capturing is incident and through which the incident light passes. For example, while condensing rays of incident light, the lens 10 transmits light in a certain wavelength band according to the color of the filter. The light that has passed through the filter reaches the sensor 20. The sensor 20 is an image sensor and receives the light that has passed through the opening of the lens 10. Examples of the sensor 20 include a charge coupled device (CCD) image sensor and a complementary metal oxide semiconductor (CMOS) image sensor. According to one aspect of the present embodiment, the sensor 20 includes a sensor that receives red light (an R sensor), a sensor that receives green light (a G sensor), and a sensor that receives blue light (a B sensor). The sensors receive respective light components corresponding to particular wavelength bands, and generate captured images (an R image, a G image, and a B image).

The CPU 30 controls operations of the image capturing device 100 totally. Specifically, the CPU 30 executes a computer program stored in the HDD 40, for example, and controls operations of the image capturing device 100 totally. For example, the CPU 30 calculates the depth to the subject based on the captured images generated by the sensor 20. The CPU 30 then generates an image with distance information in accordance with the calculated depth. After that, the CPU 30 generates a display image to be presented to a user based on the captured images and the image with distance information.

The HDD 40 is a nonvolatile and rewritable storage device. For example, the HDD 40 stores therein a computer program and various types of data relating to control of the image capturing device 100. The memory card slot 50 is an interface of a portable storage medium. Into the memory card slot 50, a portable storage medium such as a secure digital (SD) memory card or a secure digital high capacity (SDHC) memory card can be inserted, for example. The display 60 displays various types of information or images (e.g., the display image). The display 60 is a liquid crystal display or a touch panel, for example.

Figure 2:
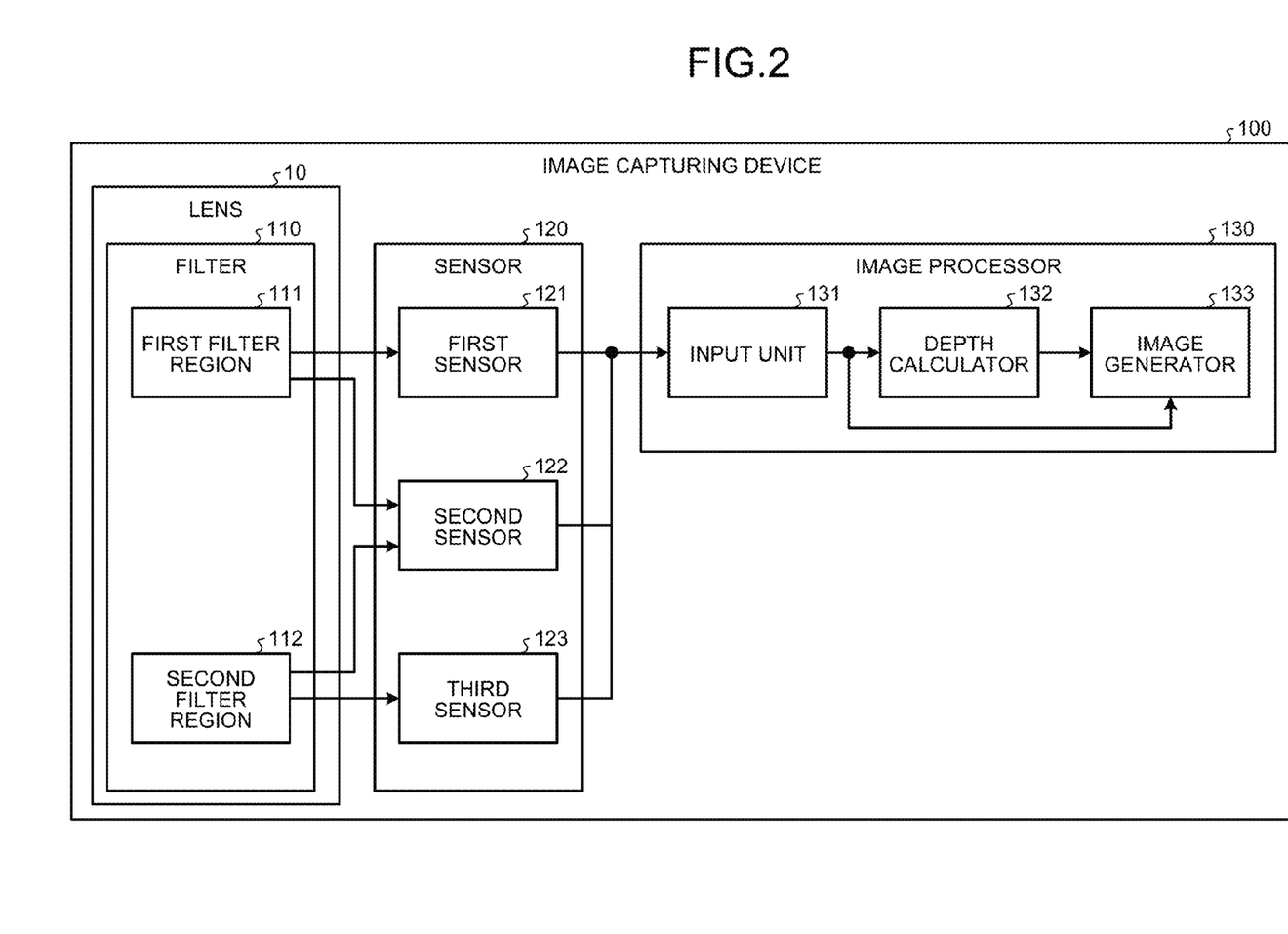
FIG. 2 is a block diagram illustrating the functional configuration of the image capturing device according to the first embodiment.

FIG. 2 is a block diagram illustrating an example of the functional configuration of the image capturing device 100 according to the first embodiment. As illustrated in FIG. 2, the image capturing device 100 includes the lens 10 including a filter 110 at its opening, a sensor 120, and an image processor 130. The filter 110 includes a first filter region 111 and a second filter region 112. The sensor 120 includes a first sensor 121, a second sensor 122, and a third sensor 123. The filter 110 is disposed on one of both surfaces of the lens 10, closer to the sensor 120 or on the other surface farther from the sensor 120. In other words, the lens 10 may be disposed between the sensor 120 and the filter 110. Alternatively, the filter 110 may be disposed between the sensor 120 and the lens 10. The image processor 130 includes an input unit 131, a depth calculator 132, and an image generator 133. The whole or a part of the image processor 130 may be implemented with software (a computer program) or a hardware circuitry. The following describes the sensor 120 including an RGB sensor for exemplary purpose and is not limiting. The sensor may include other wavelength bands.

The filter 110 is a color filter that transmits the light in a particular wavelength band. For example, the entire area of the filter 110 is constituted of a plurality of regions not overlapping with each other. In the first embodiment, the regions are the first filter region 111 and the second filter region 112. That is, the entire area of the filter 110 is constituted of the first filter region 111 and the second filter region 112. The entire area of the opening constituted of such filter regions transmits a common color representing a color that is common to the filter regions. It is noted that the filter regions have different optical transparencies. The plane of the filter 110 is preferably arranged in parallel with the image pickup plane of the sensor 120 so that a larger amount of light passes through the filter.

The first filter region 111 transmits a plurality of colors of a first combination out of the colors of the light received by the sensor 120. The first combination can be defined arbitrarily. For example, the first filter region 111 is a filter region called a "yellow (Y) filter" that transmits red light and green light. The second filter region 112 transmits a plurality of colors of a second combination different from the first combination out of the colors of the light received by the sensor 120. For example, the second filter region 112 is a filter region called a "cyan (C) filter" that transmits green light and blue light. That is, in this example, the common color is green. Some RGB sensors include therein a larger number of sensors that receive green light than the number of sensors that receive red light or the number of sensors that receive blue light, rather than including the respective sensors uniformly. Such an RGB sensor can receive a larger amount of light by defining the common color as green, in this example.

The above-described combination of the first filter region 111 and the second filter region 112 is provided merely for exemplary purpose and not limiting. For another example, the first filter region 111 may be a filter region called a "Y filter" that transmits red light and green light, and the second filter region 112 may be a filter region called a "magenta (M) filter" that transmits red light and blue light. In this example, the common color is red. In addition, the first filter region 111 may be the M filter that transmits red light and blue light, and the second filter region 112 may be the C filter that transmits green light and blue light. In this example, the common color is blue. In the description of the present embodiment, the first filter region 111 is the Y filter and the second filter region 112 is the C filter, for example. Typically, complementary-color filters of Y, C, and M are known to transmit a larger amount of light in comparison with primary-color filters of R, G, and B having the same transmittance in the same wavelength band.

Figure 3:
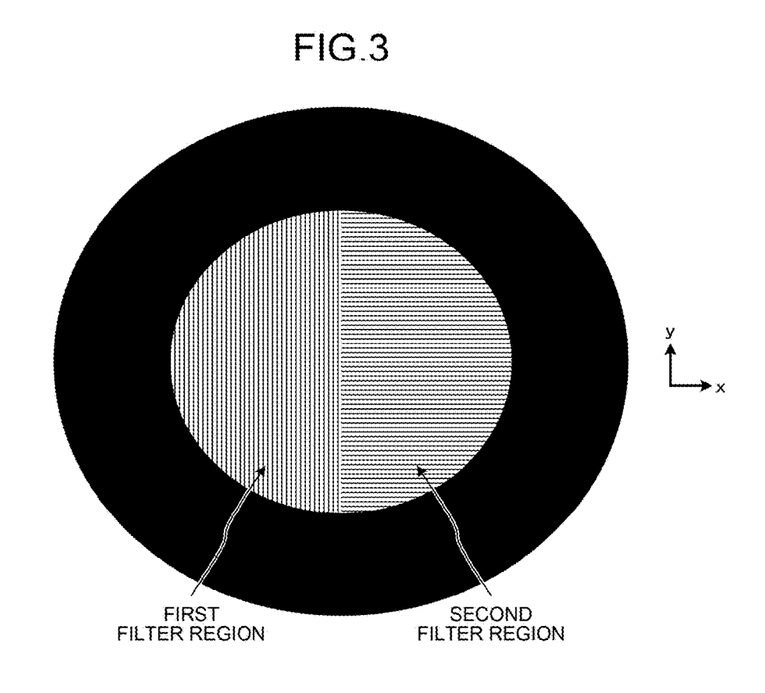
FIG. 3 is a diagram for explaining filter regions according to the first embodiment.

FIG. 3 is a diagram for explaining exemplary filter regions according to the first embodiment. As illustrated in FIG. 3, the filter 110 of the lens 10 includes the first filter region 111 (the area represented with vertical lines) that is the Y filter; and the second filter region 112 (the area represented with horizontal lines) that is the C filter. As described above, the entire area of the filter 110 is constituted of a plurality of regions not overlapping with each other. At the opening of the lens 10, the first filter region 111 is preferably arranged such that it matches the second filter region if it is rotated around the optical center of the lens 10. If the first filter region 111 and the second filter region 112 do not constitute the entire opening of the lens 10, they are preferably arranged at positions evenly away from the optical center of the lens 10, in addition to being arranged in the above-described manner.

Returning to FIG. 2, the sensor 120 is an image sensor and receives the light that has passed through the opening of the lens 10. The first sensor 121 receives red light and generates a captured image (an R image). The second sensor 122 receives green light and generates a captured image (a G image). The third sensor 123 receives blue light and generates a captured image (a B image). The generated captured images (the R image, the G image, and the B image) are output to the image processor 130. If the first filter region 111 is the Y filter and the second filter region 112 is the C filter, for example, the first sensor 121 receives red light out of the light that has passed through the first filter region 111; the second sensor 122 receives green light out of the light that has passed through the first filter region 111 and the second filter region 112; and the third sensor 123 receives blue light out of the light that has passed through the second filter region 112.

As described above, the second sensor 122 receives green light that has passed through both the first filter region 111 and the second filter region 112. Thus, the green light is less influenced by the absorption of light in the entire filter 110. This configuration can provide a brighter and less noisy G image in comparison with other captured images. This configuration allows the green light to pass through a plurality of filter regions, whereby the G image is less influenced by installation of the filter 110. The generated G image is therefore almost an ideal image obtained when no filter 110 is installed (referred to as a "reference image"). Out of the captured images, the R image and the B image are generated from the received light that has passed through one of the first filter region 111 and the second filter region 112. The R image and the B image are more likely to change than the reference image or the G image.

Figure 4:
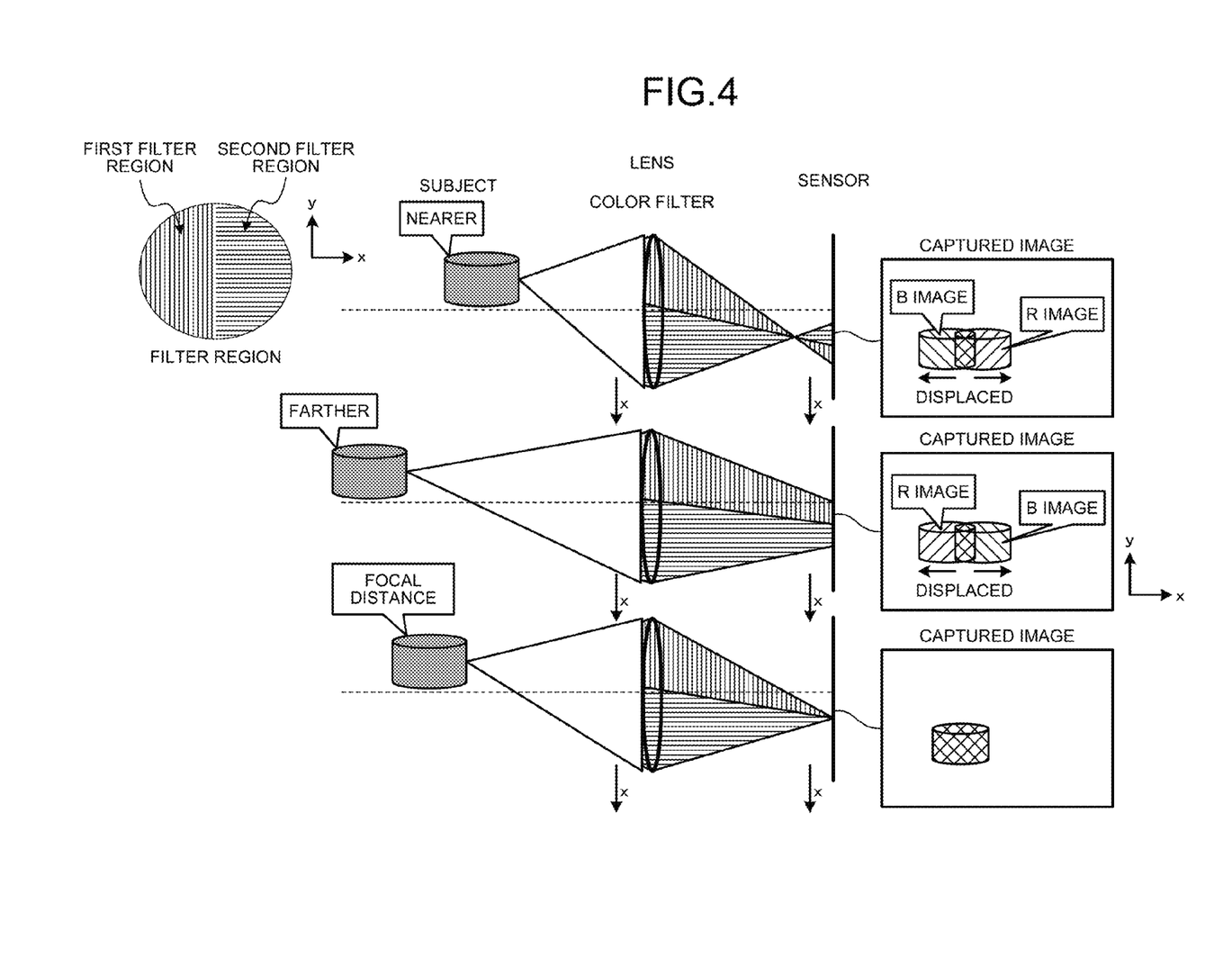
FIG. 4 is a diagram for explaining changes of the captured images according to the first embodiment.

FIG. 4 is a diagram for explaining exemplary changes of the captured images according to the first embodiment. The arrangement of the filter regions in FIG. 4 is the same as the example illustrated in FIG. 3. The upper diagram in FIG. 4 illustrates a subject being at a position nearer than the position of a focal distance. The middle diagram in FIG. 4 illustrates a subject being at a position farther than the position of the focal distance. The lower diagram in FIG. 4 illustrates a subject being at the focal distance.

As illustrated in the upper diagram in FIG. 4, if the subject is positioned nearer than an object being focused, the R image (a cylinder represented with positive slopes) is displaced in the first direction (e.g., to the right) relative to the reference image or the G image (that is, a phase shift occurs). As illustrated in the middle diagram in FIG. 4, if the subject is positioned farther than the object being focused, the R image is displaced in the second direction (e.g., to the left) opposite to the first direction relative to the reference image or the G image. By contrast, as illustrated in the upper diagram in FIG. 4, if the subject is positioned nearer than the object being focused, the B image (a cylinder represented with negative slopes) is displaced in the second direction (e.g., to the left) relative to the reference image or the G image. As illustrated in the middle diagram in FIG. 4, if the subject is positioned farther than the object being focused, the B image is displaced in the first direction (e.g., to the right) relative to the reference image or the G image. That is, in scenes captured in RGB images that are captured images, an image can be observed at displaced positions to the right or left in accordance with the depth relative to the subject at the focal distance. This phase shift is inverted between an image nearer than the position of the focal distance and an image farther than the position of the focal distance. In the area where the phase has shifted, the image blurs. The following describes calculation of the depth of scenes by utilizing such characteristics of captured images.

The image processor 130 calculates the depth to the subject based on RGB images that are captured images. The image processor 130 then generates an image with distance information in accordance with the calculated depth. The image with distance information is a two-dimensional image associated with the depth information in the space. The image processor 130 generates a display image to be presented to a user based on the R image, the G image, and the B image, which are the captured images, and the generated image with distance information. The input unit 131 inputs the captured images. For example, the input unit 131 receives the captured images (the R image, the G image, and the B image) from the sensor 120 and inputs them to the depth calculator 132 and the image generator 133.

The depth calculator 132 calculates the depth to the subject based on the captured images. The depth calculator 132 then generates an image with distance information in accordance with the calculated depth. More specifically, the depth calculator 132 calculates color displacement amounts of the respective images relative to the G image out of the captured images (the R image, the G image, and the B image) input by the input unit 131. The depth calculator 132 then calculates the distance to the object captured at the position of the pixels, thereby generating the image with distance information. The color displacement amounts of the respective images are calculated on the basis of the image in the common color. As described above, the pixels in the R image, the G image, and the B image are shifted to the positions of the respective images in the first direction or the second direction (e.g., to the right or the left) in accordance with the depth to the subject whose image is captured. The G image has a little color displacement amount in comparison with the reference image. In this manner, the depth calculator 132 calculates the color displacement amounts of the respective images on the basis of the G image.

For example, the pixel of the G image that is the target for calculating the distance is defined as $Y_G(x, y)$, the pixel of the R image corresponding to $Y_G(x, y)$ is defined as $Y_R(x, y)$, and the pixel of the B image corresponding to $Y_G(x, y)$ is defined as $Y_B(x, y)$. The displacement amount in accordance with the depth is represented with d. The pixel $Y_R(x, y)$ in the R image can therefore be represented by $Y_R(x-d, y)$. In the same manner, the pixel $Y_B(x, y)$ in the B image can be represented by $Y_B(x+d, y)$. The value of the displacement amount d is 0 if the subject is at the focal distance. The value of d is positive if the subject is at a distance larger than the focal distance, and the value of d is negative if the subject is at a distance smaller than the focal distance. The magnitude |d| of the displacement amount d has a characteristic of simply increasing in proportion to the difference between the distance to the subject and the focal distance. Thus, the distance to the object captured in the pixels can be uniquely calculated based on the displacement amount d. The distance to the subject is determined by the focal distance, the displacement amount, the size of the opening of the lens, and the f-number of the lens, for example. These pieces of information can be obtained by measuring in advance.

Conventional matching methods can be used for calculating the displacement amount d. Examples of the matching methods include one based on the luminance difference of images and one based on the color distribution by utilizing the characteristic of color components in nature description images having a linear relation locally. In the matching method based on the color distribution, the displacement amount d is calculated by utilizing the linear characteristic of the color distribution of the pixel value in the local area around the pixel (x, y). In the method, assuming that the displacement amount d is generated in an image, the image is virtually defined in the local area around $Y_G(x, y)$, $Y_R(x-d, y)$, and $Y_B(x+d, y)$. Based on dispersion in the color distribution of the defined image, an index L is calculated (refer to Equation (1)).

$$L(x, y; d) = \lambda_0 \lambda_1 \lambda_2 / \sigma_R^2 \sigma_G^2 \sigma_B^2 \quad (1)$$

where $\lambda_0$, $\lambda_1$, and $\lambda_2$ represent the dispersion along the main component axes of the color distribution in the image (the eigenvalues of the covariance matrix in the image); and $\sigma_R^2$, $\sigma_G^2$, and $\sigma_B^2$ represent the dispersion along the R, G, and B axes of the color distribution. It is publicly known that the value of L increases with an increase in the amount of the color displacement in the image. Therefore, calculating the value of d corresponding to the minimum L(x, y; d) can obtain the depth of the coordinates (x, y).

The image generator 133 generates a display image based on the captured images and the image with distance information. The display image may be the image with distance information or the RGB images, for example. The display image may also be a corrected image in terms of the color displacement in which the displacement of the R image and the B image out of the RGB images is corrected in accordance with the displacement amount d of the pixels corresponding to the distance. The display image may also be an image obtained by removing the focal blurring from the corrected image in terms of the color displacement in accordance with the distance. The display image may also be an image obtained by adding the focal blurring from the corrected image in terms of the color displacement in accordance with the distance. If the lens 10 includes a focusing mechanism, the depth information can be output to the focusing mechanism of the lens 10 and used for improving a focus speed.

Figure 5:
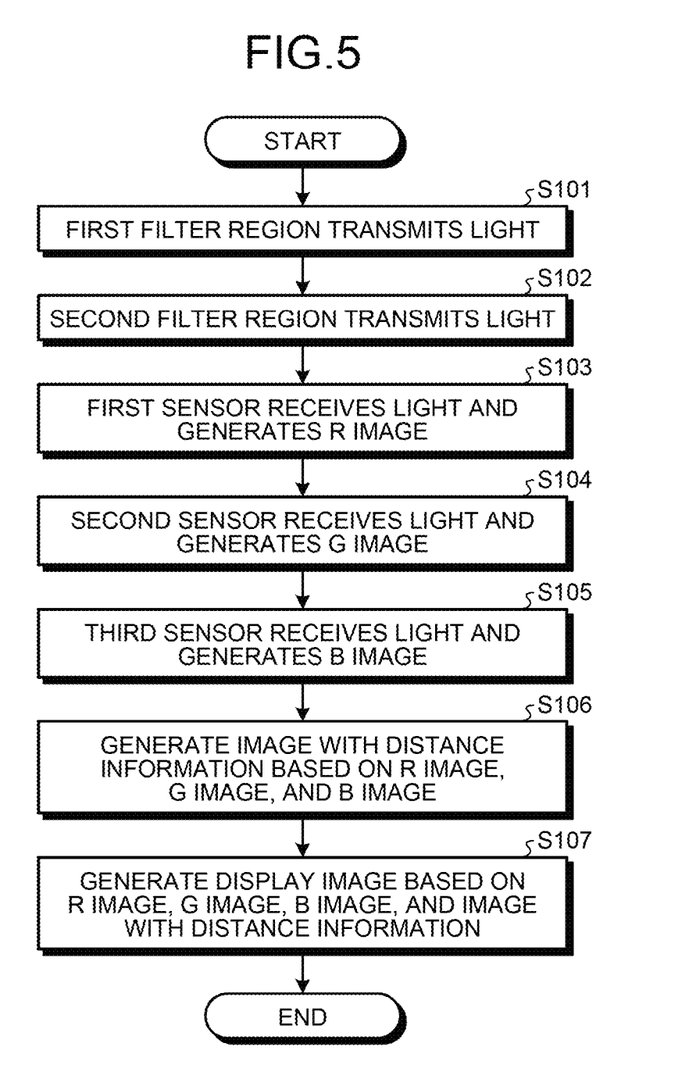
FIG. 5 is a flowchart illustrating a process executed by the image capturing device according to the first embodiment.

The following describes a process executed by the image capturing device 100 according to the first embodiment with reference to FIG. 5. FIG. 5 is a flowchart illustrating an exemplary process executed by the image capturing device 100 according to the first embodiment.

As illustrated in FIG. 5, the first filter region 111 (the Y filter) transmits red light and green light (Step S101). The second filter region 112 (the C filter) transmits green light and blue light (Step S102). The first sensor 121 receives red light and generates an R image that is one of captured images (Step S103). The second sensor 122 receives green light and generates a G image that is one of the captured images (Step S104).

The third sensor 123 receives blue light and generates a B image that is one of the captured images (Step S105). The R image generated by the first sensor 121, the G image generated by the second sensor 122, and the B image generated by the third sensor 123 are output to the input unit 131. The input unit 131 in turn inputs the R image, the G image, and the B image to the depth calculator 132 and the image generator 133.

The depth calculator 132 calculates the color displacement amounts of the respective images relative to the G image out of the R image, the G image, and the B image input by the input unit 131. The depth calculator 132 then calculates the distance to an object captured at the position of the pixels, thereby generating an image with distance information (Step S106). The image generator 133 generates a display image to be presented to a user based on the R image, the G image, and the B image input by the input unit 131 and the image with distance information generated by the depth calculator 132 (Step S107).

According to the present embodiment, the image of the subject is captured through the lens 10 in which two kinds of filter regions having different optical transparencies and transmitting the common color light are disposed. In this configuration, a brighter and less noisy image can be acquired and an image with distance information is generated on the basis of the image corresponding to the common color. As a result, the distance information can be acquired with high accuracy.

Second Embodiment

Figure 6:
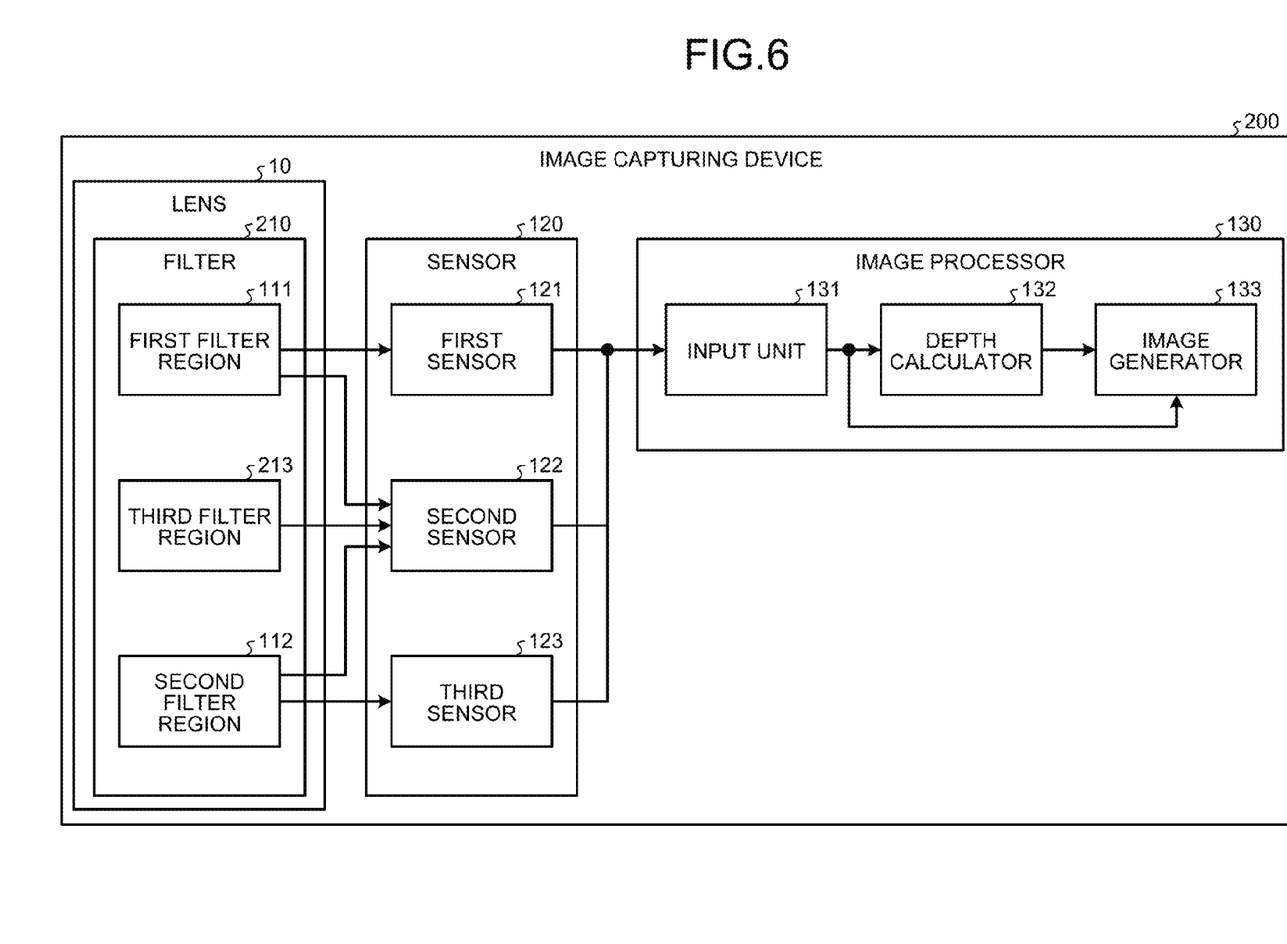
FIG. 6 is a block diagram illustrating the functional configuration of an image capturing device according to a second embodiment.

FIG. 6 is a block diagram illustrating an example of the functional configuration of an image capturing device according to a second embodiment. In the description of the second embodiment, common numerals are assigned to similar components to those in the first embodiment, and detailed explanation thereof may be omitted. The function, the configuration, and the processing in the second embodiment are similar to those in the first embodiment except for a filter 210 to third filter region 213) described below.

As illustrated in FIG. 6, an image capturing device 200 includes the lens 10 including the filter 210 at its opening, the sensor 120, and the image processor 130. The filter 210 includes the first filter region 111, the second filter region 112, and the third filter region 213. The sensor 120 includes the first sensor 121, the second sensor 122, and the third sensor 123. The image processor 130 includes the input unit 131, the depth calculator 132, and the image generator 133. The whole or a part of the image processor 130 may be implemented with software (a computer program) or a hardware circuitry.

The filter 210 is a color filter that transmits the light in a particular wavelength band. For example, the entire area of the filter 210 is constituted of a plurality of regions not overlapping with each other. In the second embodiment, the regions are the first filter region 111, the second filter region 112, and the third filter region 213. That is, the entire area of the filter 210 is constituted of the first filter region 111, the second filter region 112, and the third filter region 213. The entire area of the opening constituted of such filter regions transmits a common color representing a color that is common to the filter regions. It is noted that the filter regions have different optical transparencies. The plane of the filter 210 is preferably arranged in parallel with the image pickup plane of the sensor 120 so that a larger amount of light passes through the filter. In the description of the second embodiment, in the same manner as the first embodiment, the first filter region 111 is the Y filter and the second filter region 112 is the C filter, for example. That is, the common color is green in the second embodiment.

The third filter region 213 transmits the common color out of the colors of the light received by the sensor 120. For example, the third filter region 213 is a G filter that transmits green light, which is a common color of the light passing through the first filter region 111 and the second filter region 112. In other words, the third filter region 213 blocks the light other than the light of the common color (e.g., the red light and the blue light if the common color is green). In the above-described description, the common color is green and the third filter region 213 is the G filter. This is provided merely for exemplary purpose and not limiting. If the common color is another color (e.g., red or blue), the third filter region 213 is a filter corresponding to the color.

Figure 7A:
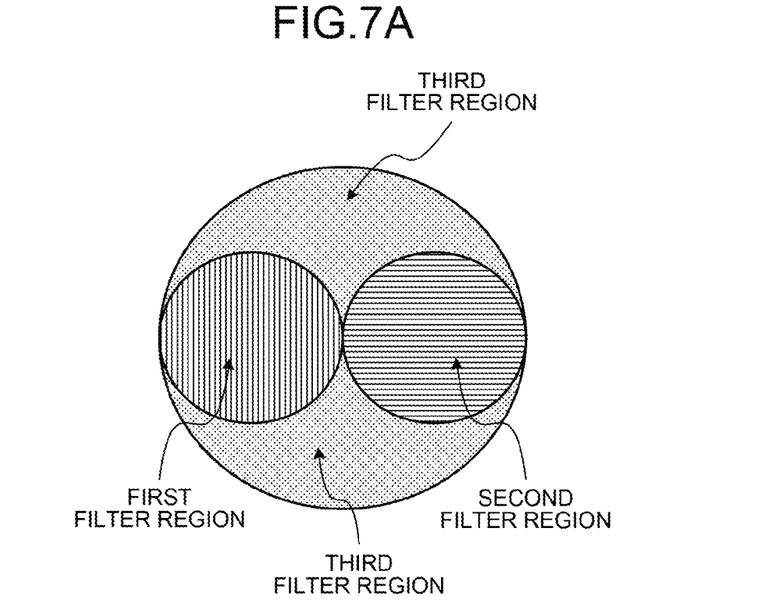
FIG. 7A is a diagram for explaining filter regions according to the second embodiment.
Figure 7B:
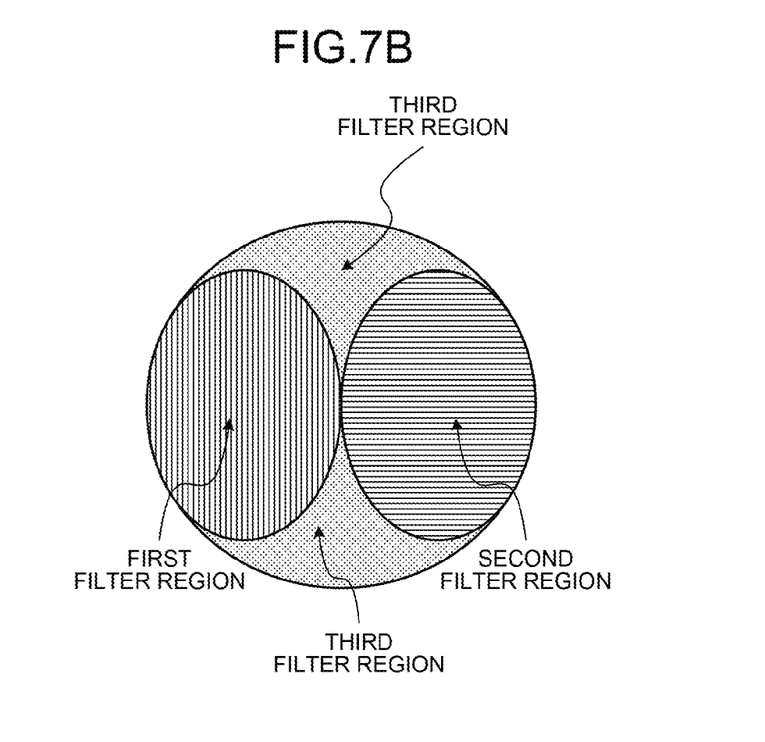
FIG. 7B is a diagram for explaining filter regions according to the second embodiment.

FIGS. 7A and 7B are diagrams for explaining exemplary filter regions according to the second embodiment. As illustrated in FIGS. 7A and 7B, the filter 210 of the lens 10 includes the first filter region 111 (the area represented with vertical lines) that is the Y filter; the second filter region 112 (the area represented with horizontal lines) that is the C filter; and the third filter region 213 (the area represented with shading) that is the G filter. As described above, the entire area of the filter 210 is constituted of a plurality of regions not overlapping with each other. The first filter region 111 is preferably arranged symmetrically with the second filter region 112 with respect to the straight perpendicular line passing through the optical center of the lens 10 and the respective center points of gravity of the filter regions. The shape of the first filter region 111 and the second filter region 112 is not limited to a circle or an ellipse as illustrated in FIG. 7A or 7B.

The position, shape, and size of the filter regions may be defined arbitrarily. The shape of the first filter region 111 and the second filter region 112 can control the blurring state of the R image and the B image generated by the sensor 120. Specifically, changing the shape of the filter regions can control arbitrarily a point-spread function (PSF) that is a blur function of the sensor 120, thereby controlling the blurring state of the R image and the B image generated by the sensor 120. In FIGS. 7A and 7B, the blur functions of the R image and the B image are identical to each other. Controlling the blurring of the images to be symmetrical with each other can prevent a display image from being recognized as unnatural. Identical blurring of the R image and the B image facilitates matching of the R image and the B image, thereby improving the accuracy of depth estimation. The displacement of the R image and the B image is the same as that in the first embodiment.

The processing executed by the sensor 120 is similar to that in the first embodiment. The second sensor 122 receives green light that has passed through the filter regions and generates a captured image (the G image). That is, the second sensor 122 generates the G image serving as the basis of generating the image with distance information by receiving the green light that has passed through the three filter regions, namely, the first filter region 111, the second filter region 112, and the third filter region 213. This processing can generate the G image that is more similar to an ideal reference image.

Figure 8:
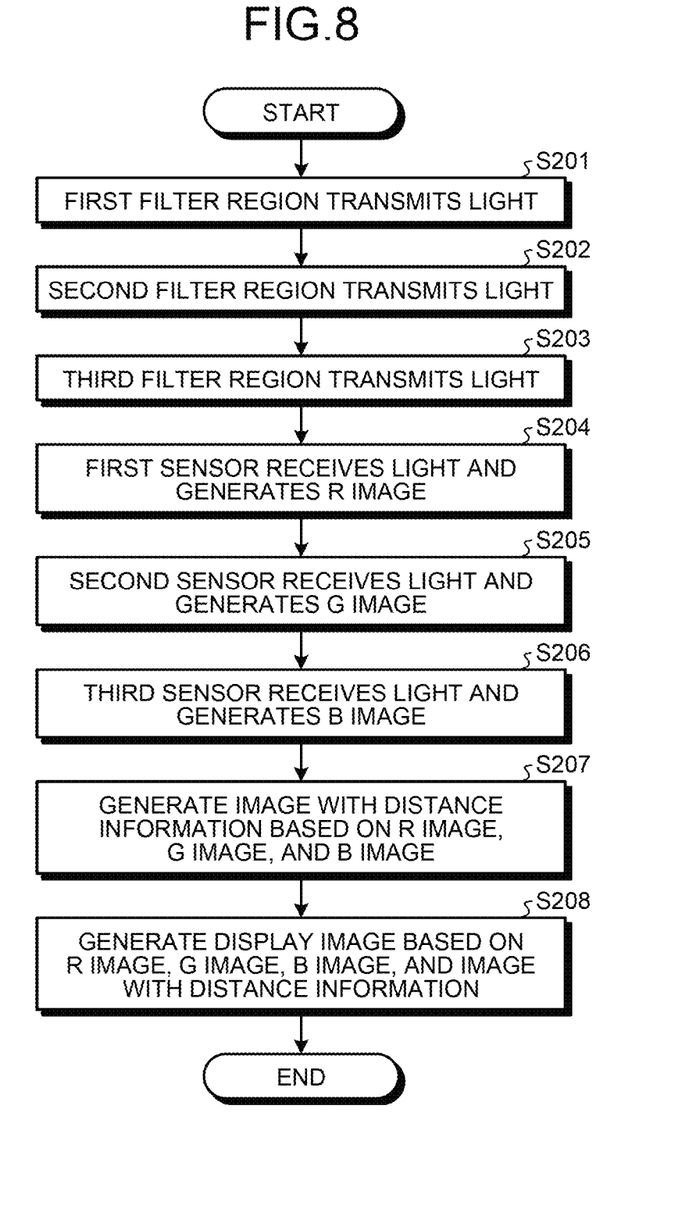
FIG. 8 is a flowchart illustrating a process executed by the image capturing device according to the second embodiment.

The following describes a process executed by the image capturing device 200 according to the second embodiment with reference to FIG. 8. FIG. 8 is a flowchart illustrating an exemplary process executed by the image capturing device 200 according to the second embodiment.

As illustrated in FIG. 8, the first filter region 111 (the Y filter) transmits red light and green light (Step S201). The second filter region 112 (the C filter) transmits green light and blue light (Step S202). The third filter region 213 (the G filter) transmits green light (Step S203). The first sensor 121 receives red light and generates an R image that is one of captured images (Step S204). The second sensor 122 receives green light and generates a G image that is one of the captured images (Step S205).

The third sensor 123 receives blue light and generates a B image that is one of the captured images (Step S206). The R image generated by the first sensor 121, the G image generated by the second sensor 122, and the B image generated by the third sensor 123 are output to the input unit 131. The input unit 131 in turn inputs the R image, the G image, and the B image to the depth calculator 132 and the image generator 133.

The depth calculator 132 calculates the color displacement amounts of the respective images relative to the G image out of the R image, the G image, and the B image input by the input unit 131. The depth calculator 132 then calculates the distance to the object captured at the position of the pixels, thereby generating an image with distance information (Step S207). The image generator 133 generates a display image to be presented to a user based on the R image, the G image, and the B image generated by the input unit 131 and the image with distance information generated by the depth calculator 132 (Step S208).

According to the present embodiment, the image of the subject is captured through the lens 10 including one kind of filter region that transmits light of a common color and is capable of controlling the blur function of the image to be acquired in addition to two kinds of filter regions that have different optical transparencies and transmit the common color light. In this configuration, the distance information can be obtained with high accuracy and a display image to be presented to a user is prevented from being recognized as unnatural.

Third Embodiment

Figure 9:
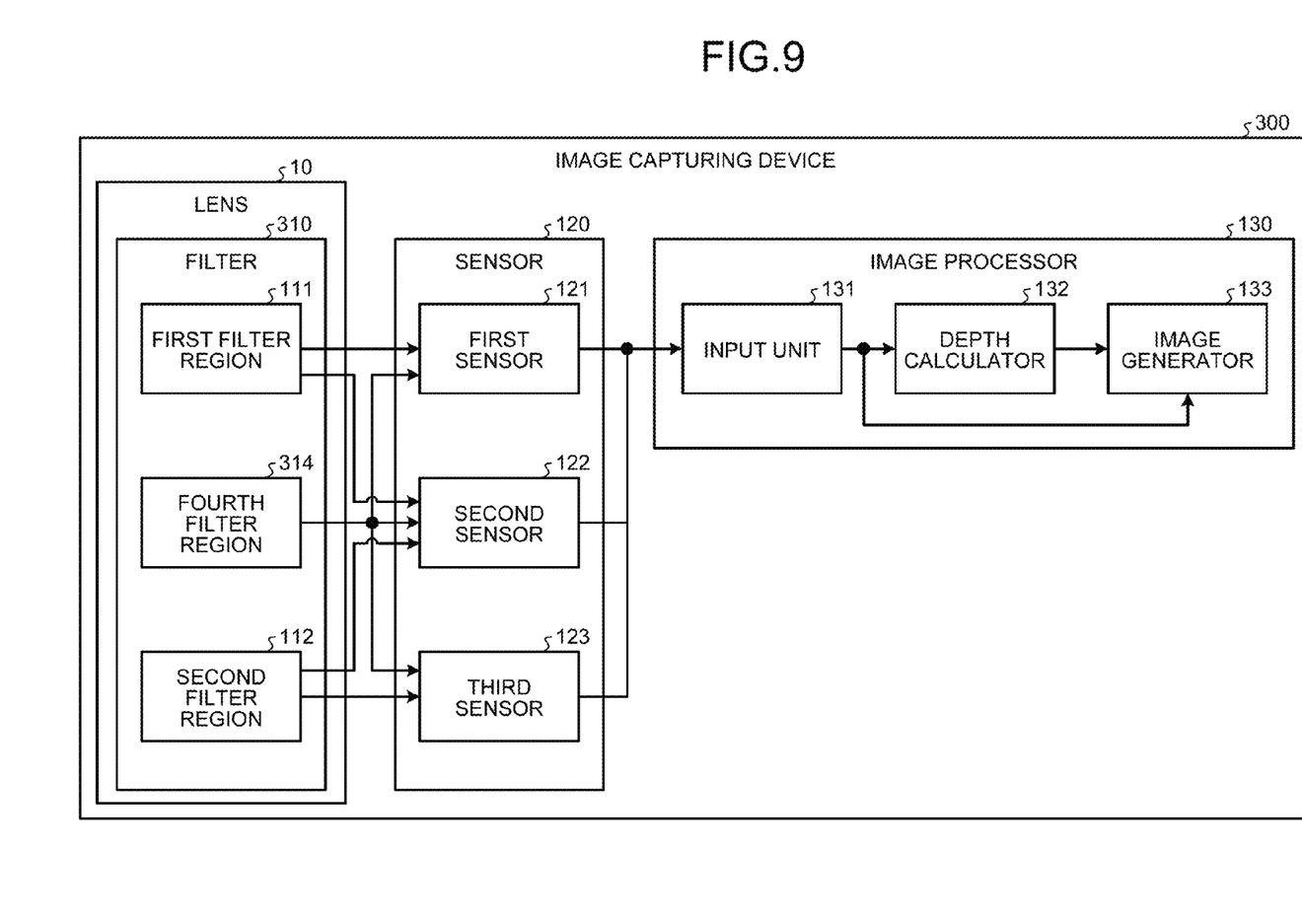
FIG. 9 is a block diagram illustrating the functional configuration of an image capturing device according to a third embodiment.

FIG. 9 is a block diagram illustrating an example of the functional configuration of an image capturing device according to a third embodiment. In the description of the third embodiment, common numerals are assigned to similar components to those in the first embodiment, and detailed explanation thereof may be omitted. The function, configuration, and processing in the third embodiment are similar to those in the first embodiment except for a filter 310 (a fourth filter region 314) described below.

As illustrated in FIG. 9, an image capturing device 300 includes the lens 10 including the filter 310 at its opening, the sensor 120, and the image processor 130. The filter 310 includes the first filter region 111, the second filter region 112, and the fourth filter region 314. The sensor 120 includes the first sensor 121, the second sensor 122, and the third sensor 123. The image processor 130 includes the input unit 131, the depth calculator 132, and the image generator 133. The whole or a part of the image processor 130 may be implemented with software (a computer program) or a hardware circuitry.

The filter 310 is a color filter that transmits the light in a particular wavelength band. For example, the entire area of the filter 310 is constituted of a plurality of regions not overlapping with each other. In the third embodiment, the regions are the first filter region 111, the second filter region 112, and the fourth filter region 314. That is, the entire area of the filter 310 is constituted of the first filter region 111, the second filter region 112, and the fourth filter region 314. The entire area of the opening constituted of such filter regions transmits a common color representing a color that is common to the filter regions. It is noted that the filter regions have different optical transparencies. The plane of the filter 310 is preferably arranged in parallel with the image pickup plane of the sensor 120 so that a larger amount of light passes through the filter. In the description of the third embodiment, in the same manner as the first embodiment, the first filter region 111 is the Y filter and the second filter region 112 is the C filter, for example. That is, the common color is green in the third embodiment.

The fourth filter region 314 transmits light of all colors of the light received by the sensor 120. For example, the fourth filter region 314 is a filter region called a "transparent filter" that transmits light of all colors of the light coming to the filter 310. The fourth filter region 314 that is a transparent filter transmits green light, which is a common color of the light passing through the first filter region 111 and the second filter region 112. The light that has passed through the fourth filter region 314 is received by all of the image sensors included in the sensor 120. No filter may be provided at the position of the fourth filter region 314.

Specifically, the first sensor 121 receives red light out of the light that has passed through the first filter region 111 and the fourth filter region 314 and generates a captured image (the R image). The second sensor 122 receives green light out of the light that has passed through the first filter region 111, the second filter region 112, and the fourth filter region 314 and generates a captured image (the G image). The third sensor 123 receives blue light out of the light that has passed through the second filter region 112 and the fourth filter region 314 and generates a captured image (the B image). That is, the image sensors generating the R image, the G image, and the B image, respectively, receive the light that has passed through the fourth filter region 314 that is a transparent filter. This configuration allows a larger amount of light to be received. As a result, the image capturing device 300 can generate a brighter and less noisy display image.

Figure 10A:
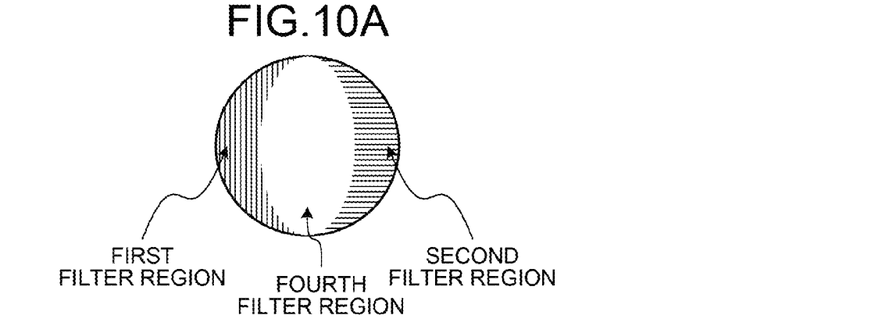
FIG. 10A is a diagram for explaining filter regions according to the third embodiment.
Figure 10B:
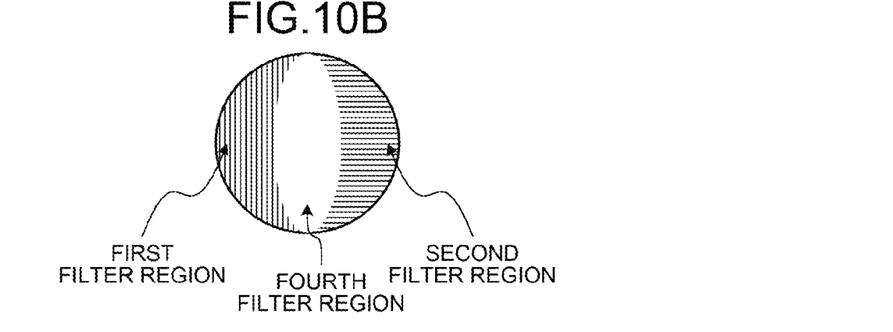
FIG. 10B is a diagram for explaining filter regions according to the third embodiment.
Figure 10C:
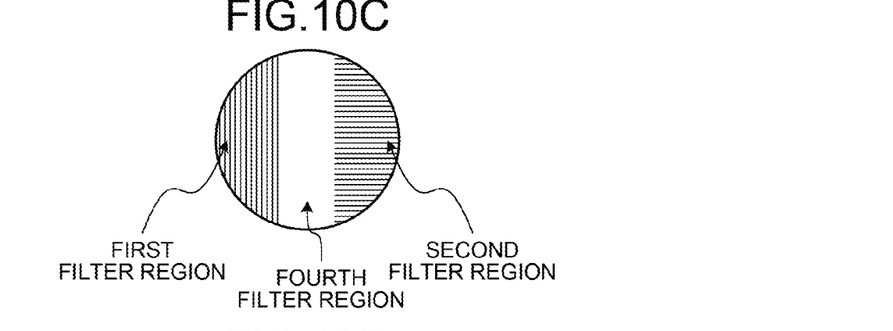
FIG. 10C is a diagram for explaining filter regions according to the third embodiment.
Figure 10D:
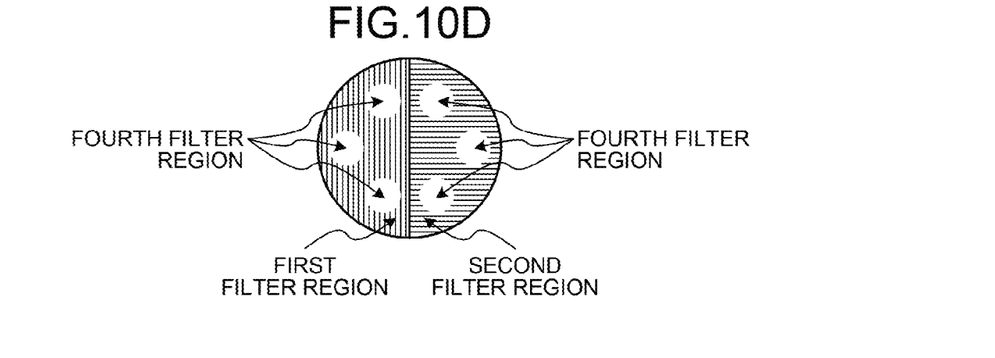
FIG. 10D is a diagram for explaining filter regions according to the third embodiment.

FIGS. 10A, 10B, 10C, and 10D are diagrams for explaining exemplary filter regions according to the third embodiment. As illustrated in FIGS. 10A to 10D, the filter 310 of the lens 10 includes the first filter region 111 (the area represented with vertical lines) that is the Y filter; the second filter region 112 (the area represented with horizontal lines) that is the C filter; and the fourth filter region 314 (the area represented in white) that is the transparent filter. As described above, the entire area of the filter 310 is constituted of a plurality of regions not overlapping with each other. The position, shape, and size of the filter regions may be defined arbitrarily. The fourth filter region 314 is preferably arranged symmetrically with respect to the straight line perpendicularly dividing into two lines the straight line passing through the respective center points of gravity of the filter regions. The fourth filter region 314 may be in the shape illustrated in FIG. 10C rather than the ellipse illustrated in FIGS. 10A and 10B. The fourth filter region 314 may be divided into a plurality of regions as illustrated in FIG. 10D. The displacement of the R image and the B image are the same as that in the first embodiment.

Figure 11:
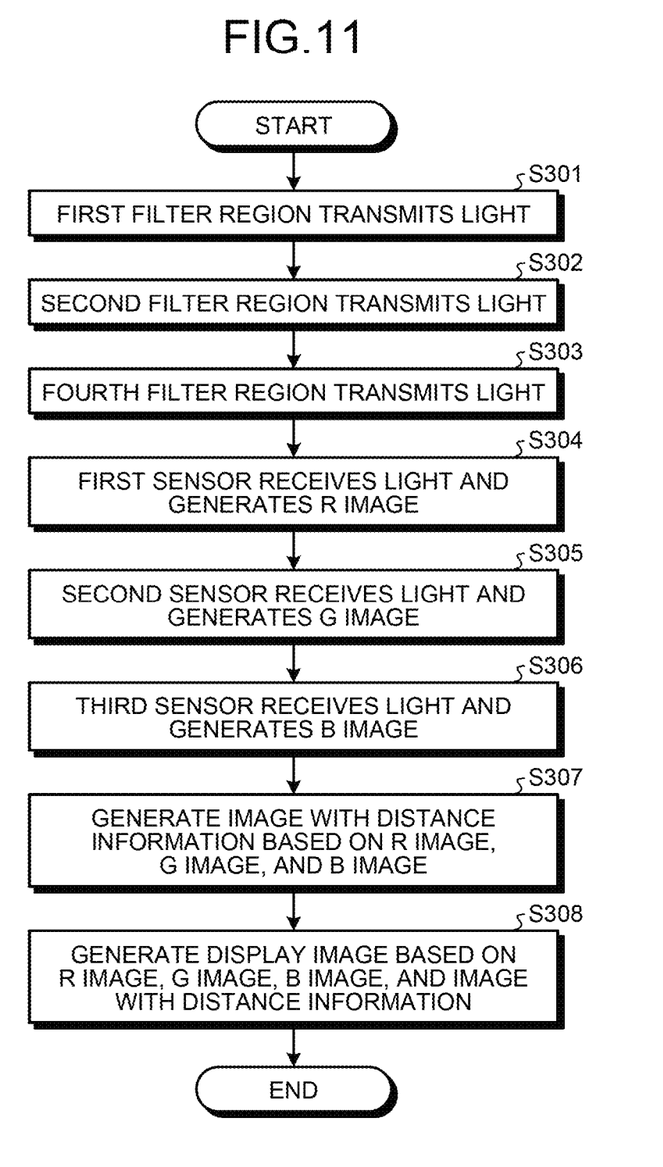
FIG. 11 is a flowchart illustrating a process executed by the image capturing device according to the third embodiment.

The following describes a process executed by the image capturing device 300 according to the third embodiment with reference to FIG. 11. FIG. 11 is a flowchart illustrating an exemplary process executed by the image capturing device 300 according to the third embodiment.

As illustrated in FIG. 11, the first filter region 111 (the Y filter) transmits red light and green light (Step S301). The second filter region 112 (the C filter) transmits green light and blue light (Step S302). The fourth filter region 314 (the transparent filter) transmits light of all colors (Step S303). The first sensor 121 receives red light and generates an R image that is one of captured images (Step S304). The second sensor 122 receives green light and generates a G image that is one of the captured images (Step S305).

The third sensor 123 receives blue light and generates a B image that is one of the captured images (Step S306). The R image generated by the first sensor 121, the G image generated by the second sensor 122, and the B image generated by the third sensor 123 are output to the input unit 131. The input unit 131 in turn inputs the R image, the G image, and the B image to the depth calculator 132 and the image generator 133.

The depth calculator 132 calculates the color displacement amounts of the respective images relative to the G image out of the R image, the G image, and the B image input by the input unit 131. The depth calculator 132 then calculates the distance to the object captured at the position of the pixels, thereby generating an image with distance information (Step S307). The image generator 133 generates a display image to be presented to a user based on the R image, the G image, and the B image generated by the input unit 131 and the image with distance information generated by the depth calculator 132 (Step S308).

According to the present embodiment, the image of the subject is captured through the lens 10 including one kind of filter region that transmits light of all colors in addition to two kinds of filter regions that have different optical transparencies and transmit the common color light. In this configuration, a brighter and less noisy image can be acquired and the distance information can be obtained with high accuracy.

Fourth Embodiment

While certain embodiments of the lens and the image capturing device have been described, the technology disclosed herein may be embodied in other different forms. The following describes other different embodiments in terms of (1) the number and types of filter regions, (2) configuration, and (3) computer program.

(1) The Number and Types of Filter Regions

The first embodiment describes the lens 10 including the filter 110 constituted of two kinds of filter regions (the first filter region 111 and the second filter region 112) that transmit a common color light and have different optical transparencies. The second embodiment describes the lens 10 including the filter 210 constituted of two kinds of filter regions (the first filter region 111 and the second filter region 112) that transmit a common color light and have different optical transparencies and one kind of filter region (the third filter region 213) that transmits the common color light. The third embodiment describes the lens 10 including the filter 310 constituted of two kinds of filter regions (the first filter region 111 and the second filter region 112) that transmits a common color light and have different optical transparencies and one kind of filter region (the fourth filter region 314) that transmits light of all colors. In the present embodiment, the number and types of the filter regions are not limited to the examples described above.

Specifically, any number and types of filter regions may be disposed in addition to the first filter region 111 and the second filter region 112. For example, any number and types of filter regions may be disposed as an additional filter region out of the R filter, the G filter, the B filter, the Y filter, the C filter, the M filter, and the transparent filter in addition to the first filter region 111 and the second filter region 112. In the same manner as the above-described embodiments, the filter regions transmit the light of a common color.

In the above-described embodiments, a plurality of filter regions are disposed in the entire area of the opening of the lens 10. The description is provided merely for exemplary purpose and not limiting. The filter regions may not be disposed across the entire area of the opening of the lens 10. Specifically, the entire area of the opening of the lens 10 may be constituted of a filter region and a region without a filter. In this example, the entire area of the opening of the lens 10 still transmits a common color of the light.

(2) Configuration

In addition, processing or controlling procedures, specific names, and information including various types of data and parameters may be modified in any manner unless specified otherwise. Each of the components of the apparatuses illustrated herein is merely a depiction of concepts or functionality, and does not necessarily configured physically in the manner illustrated in the drawings. In other words, specific configurations in which the apparatuses are distributed or integrated are not limited to those illustrated in the drawings, and the whole or a part of the apparatuses may be distributed or integrated functionally or physically in any units depending on various loads or utilization.

(3) Computer Program

The image processor 130 according to the embodiments can be implemented by using a general-purpose computer as basic hardware, for example. A computer program to be executed has a module configuration including the above-described functions. The computer program to be executed may be recorded and provided in a computer-readable recording medium such as a compact disc read only memory (CD-ROM), a compact disc recordable (CD-R), and a digital versatile disc (DVD) as an installable or executable file. In addition, the computer program to be executed may be embedded and provided in a read only memory (ROM), for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image capturing device comprising:
a lens including a filter that transmits light;
an image sensor for receiving light transmitted through the filter; and
one or more processors, wherein
the filter includes a first filter region and a second filter region, the first filter region being a region for transmitting light in a first wavelength band, the second filter region being a region for transmitting light in a second wavelength band, and a common wavelength band being included in the first wavelength band and the second wavelength band,
the image sensor generates a reference image by receiving light in the common wavelength band, generates a first image by receiving at least a part of light in the first wavelength band and generates a second image by receiving at least a part of light in the second wavelength band, and
the one or more processors calculate a distance from each pixel position to an object by calculating a color deviation of the first image with respect to the reference image and a color deviation of the second image with respect to the reference image.

2. The image capturing device according to claim 1, wherein
a number of sensors for receiving light in the common wavelength band is larger than a number of sensors for receiving light in the first wavelength band or a number of sensors for receiving light in the second wavelength band.

3. The image capturing device according to claim 1, wherein
the filter further includes a third filter region for transmitting light in a third wavelength band, and
the third wavelength band includes a part of the first waveband and a part of the second waveband.

4. The image capturing device according to claim 3, wherein
the third filter is one of a red filter, a green filter and a blue filter.

5. The image capturing device according to claim 1, wherein
the first wavelength band includes two out of red, and green and blue, the second wavelength band includes two out of red, green and blue, and
one of the two included in the second wavelength band is included in the first wavelength band, and the other of the two included in the second wavelength band is not included in the first wavelength band.

6. The image capturing device according to claim 1, wherein
a combination of the first filter region and the second filter region is any one of a combination of a yellow filter and a cyan filter, a combination of a cyan filter and a magenta filter, and a combination of a magenta filter and a yellow filter.

7. The image capturing device according to claim 1, wherein
the lens is arranged between the image sensor and the filter.

8. The image capturing device according to claim 1, wherein
the filter is arranged between the image sensor and the lens.

9. The image capturing device according to claim 1, wherein
a shape of the first filter region is point-symmetric to a shape of the second filter region with respect to an optical center of the lens.

10. The image capturing device according to claim 1, wherein
a distance between the first filter region and an optical center of the lens is equal to a distance between the second filter region and the optical center of the lens.

11. The image capturing device according to claim 1, wherein
the filter further includes a fourth filter region for transmitting light corresponding to light received by the image sensor, and
the fourth filter region is symmetrically arranged with respect to a line perpendicularly bisecting a line which connects a center of gravity of the first filter region and a center of gravity of the second filter region.

12. The image capturing device according to claim 1, wherein
the filter further includes fourth filter regions for transmitting light corresponding to light received by the image sensor, and
the fourth filter regions are symmetrically arranged with respect to a line perpendicularly bisecting a line which connects a center of gravity of the first filter region and a center of gravity of the second filter region.

13. An image capturing device comprising:
a lens including a filter that transmits light;
an image sensor for receiving light transmitted through the filter; and
one or more processors, wherein
the filter includes a first filter region and a second filter region, the first filter region being a region for transmitting light in a first combination of colors, the second filter region being a region for transmitting light in a second combination of colors, and the first filter region and the second filter region transmitting light in a common color,
the image sensor generates a reference image by receiving light in the common color, generates a first image by receiving light in other colors than the common color among the first combination of colors and generates a second image by receiving light in other colors than the common color among the second combination of colors, and
the one or more processors calculate a distance from each pixel position to an object by calculating a color deviation of the first image with respect to the reference image and a color deviation of the second image with respect to the reference image.

14. An image processing device comprising:
one or more processors, wherein
the one or more processors obtains a reference image, a first image and a second image from an image sensor,
the image sensor receives light that transmits through a filter which includes a first filter region and a second filter region,
the reference image is generated out of light in a common wavelength band, which transmits through both the first filter region and the second filter region,
the first image is generated out of at least a part of light in a wavelength band, which transmits through the first filter region,
the second image is generated out of at least a part of light in a wavelength band, which transmits through the second filter region, and
the one or more processors calculate a distance from each pixel position to an object by calculating a color deviation of the first image with respect to the reference image and a color deviation of the second image with respect to the reference image.

* * * * *